United States Patent [19]

Weishaar et al.

[11] Patent Number: 4,724,044

[45] Date of Patent: Feb. 9, 1988

[54] APPARATUS FOR POLLUTION CONTROL OF INDUSTRIAL WASTE SYSTEMS

[75] Inventors: Fern Weishaar; Walter Weishaar, both of Coram, N.Y.

[73] Assignee: Sprint Recovery Systems Inc., Coram, N.Y.

[21] Appl. No.: 919,259

[22] Filed: Oct. 15, 1986

[51] Int. Cl.⁴ .............................................. B01D 1/00
[52] U.S. Cl. ........................................ 159/32; 159/44; 159/47.3; 159/901; 159/DIG. 1; 202/160; 202/181; 202/206; 203/2; 203/10; 354/324
[58] Field of Search ............. 159/32, 44, 901, DIG. 1, 159/47.3; 354/324, 299; 203/1, 2, 10; 202/160, 181, 206; 210/180

[56] References Cited

U.S. PATENT DOCUMENTS

| | | | |
|---|---|---|---|
| 3,733,994 | 5/1973 | Armstrong et al. | 354/324 |
| 3,841,351 | 10/1974 | Shida | 354/324 |
| 3,995,298 | 11/1976 | Vandeputte et al. | 354/324 |
| 4,101,918 | 7/1978 | Schröter | 354/324 |
| 4,190,346 | 2/1980 | Hutson et al. | 354/324 |
| 4,302,317 | 11/1981 | Mock | 354/324 |
| 4,324,481 | 4/1982 | Becherer | 354/324 |
| 4,329,042 | 5/1982 | Libicky et al. | 354/324 |
| 4,350,429 | 9/1982 | Slavin | 354/324 |
| 4,367,941 | 1/1983 | Uenaka et al. | 354/324 |
| 4,421,399 | 12/1983 | Steube | 354/324 |
| 4,451,132 | 5/1984 | Kishimoto | 354/324 |
| 4,533,225 | 8/1985 | Shiga | 354/324 |

FOREIGN PATENT DOCUMENTS 2162348 6/1973 Fed. Rep. of Germany ...... 354/324

Primary Examiner—S. Leon Bashore
Assistant Examiner—V. Manoharan
Attorney, Agent, or Firm—Leonard Belkin

[57] ABSTRACT

Method and apparatus for disposing of waste rinse water used in photographic processes in which the waste rinse water is heated in a dissolution tank to be reduced to a slurry which is accumulated and stored in drums for later processing. The apparatus is compact consisting of separate tanks for the different rinse water, a holding tank to collect the contaminated rinse water and a separate dissolution tank. There is no discharge of any liquid waste products into the environment.

8 Claims, 4 Drawing Figures

APPARATUS FOR POLLUTION CONTROL OF INDUSTRIAL WASTE SYSTEMS

BACKGROUND OF THE INVENTION

The present invention relates to the cycling and treatment of rinse water in photographic processes and more particularly to a compact and simplified system for handling and treatment of rinse water utilized in installations which develop photographic film and produce prints.

Recent years have witnessed the proliferation of establishments which process film of customers and have them ready for pick up in a very short period of time such as in an hour. Under this marketing scheme it is not possible or practical to send the undeveloped film to a control plant for processing where the handling and treatment of waste rinse water can more readily be controlled and the advantages of scale can be brought to bear on the problem of eliminating waste products in the rinse water which cannot be disposed of locally.

Current regulations of local, state and federal government agencies severely restrict, regulate, or disallow the discharge of any kind of waste materials, such as photographic chemical rinse water, into municipal sewage systems or into the ground by way of cesspools and sanitary landfills.

Thus the local establishment which does its own photographic processing is faced with the conflicting requirements of not being able to dispose locally through its own sanitary system the rinse water used in the processing of its photographic products and the need either to install at great cost the proper waste treatment equipment for use with its locally generated rinse water or to ship at great expense (sometimes illegally) the waste rinse water for reprocessing at a central plant.

Existing waste disposal systems are generally designed for large scale operations and presume the availability of highly skilled personnel for their operation and maintenance. Such systems are shown in a variety of U.S. patents.

U.S. Pat. Nos. 2,997,438 shows apparatus for the removal of silver from photographic hypo baths. In modern photographic processes, silver is not the only material of interest for recovery, and there are other contaminants present which prevent the disposal of the liquid.

U.S. Pat. No. 4,054,503 discloses portable apparatus for recovering metal from metal bearing solutions. This device also is primarily concerned with the recovery of silver.

U.S. Pat. Nos. 4,069,127, 4,149,954, and 4,319,971 teach the use of electrolytic methods and apparatus for removing certain metals from solution. Electrolytic systems are complex and not suitable for use where there is very little in the way of technical support available. In addition, discharge into the sanitary system is still required.

U.S. Pat. No. 4,437,968 discloses waste water purification and recycling apparatus in which waste water is boiled to produce steam leaving the waste products in concentrated form for removal. This system can only be employed in a large scale facility and is not available where relatively small amounts of liquid wastes are to be decontaminated.

SUMMARY OF THE PRESENT INVENTION

This invention overcomes or reduces the drawbacks and disadvantages associated with present and previous systems for treating the waste chemical rinse water in photographic processing facilities without the need to discharge said rinse water into the environment. In this invention, reliable and effective treatment in a small scale facility is accomplished economically and with little care and attention during its normal operation.

In accordance with a preferred embodiment of this invention there is provided apparatus for recycling and heating rinse water in a photographic processing system without liquid discharge into the environment comprising a first circulating tank for storing rinse water for use in said photographic processing system and means for delivering the rinse water from the circulating tank to the photographic processing system for use therein and returning the rinse water to said circulating tank. A holding tank is provided to accumulate rinse water which is too contaminated for use any longer in the photographic process, said delivering means having provision for directing flow of the contents of the circulating tank when the contents thereof become too contaminated for use into the holding tank thereby permitting the preparation within the circulating tank of fresh rinse water. A dissolution tank is provided to receive waste or contaminated rinse water from the holding tank. In the dissolution tank water vapor is continuously evaporated by maintaining the waste rinse water therein at a temperature near but less than boiling so that the contaminated water becomes more concentrated with time until all of the contents of said dissolution tank form a slurry which can be readily removed by a vacuum cleaner or otherwise physically scooped away for storage and shipment in drums.

Another embodiment of this invention involves a method of reducing the contaminated rinse water to a slurry for convenient disposal without dumping any liquid into the environment.

It will be noted that in the apparatus and method as described, it is possible to treat the rinse water continuously without having to dump any of it into the ground or the sewage system.

It is thus a principal object of this invention to provide apparatus for processing waste rinse water in a photographic processing system without liquid discharge into the environment.

It is another object to provide a method or reducing to a slurry for convenient removal the waste rinse water in a photographic processing system.

Other objects and advantages of this invention will hereinafter become obvious from the following description of preferred embodiments of this invention.

DETAILED DESCRIPTION OF THE PREFERRED EMBODIMENT

Figure 1:
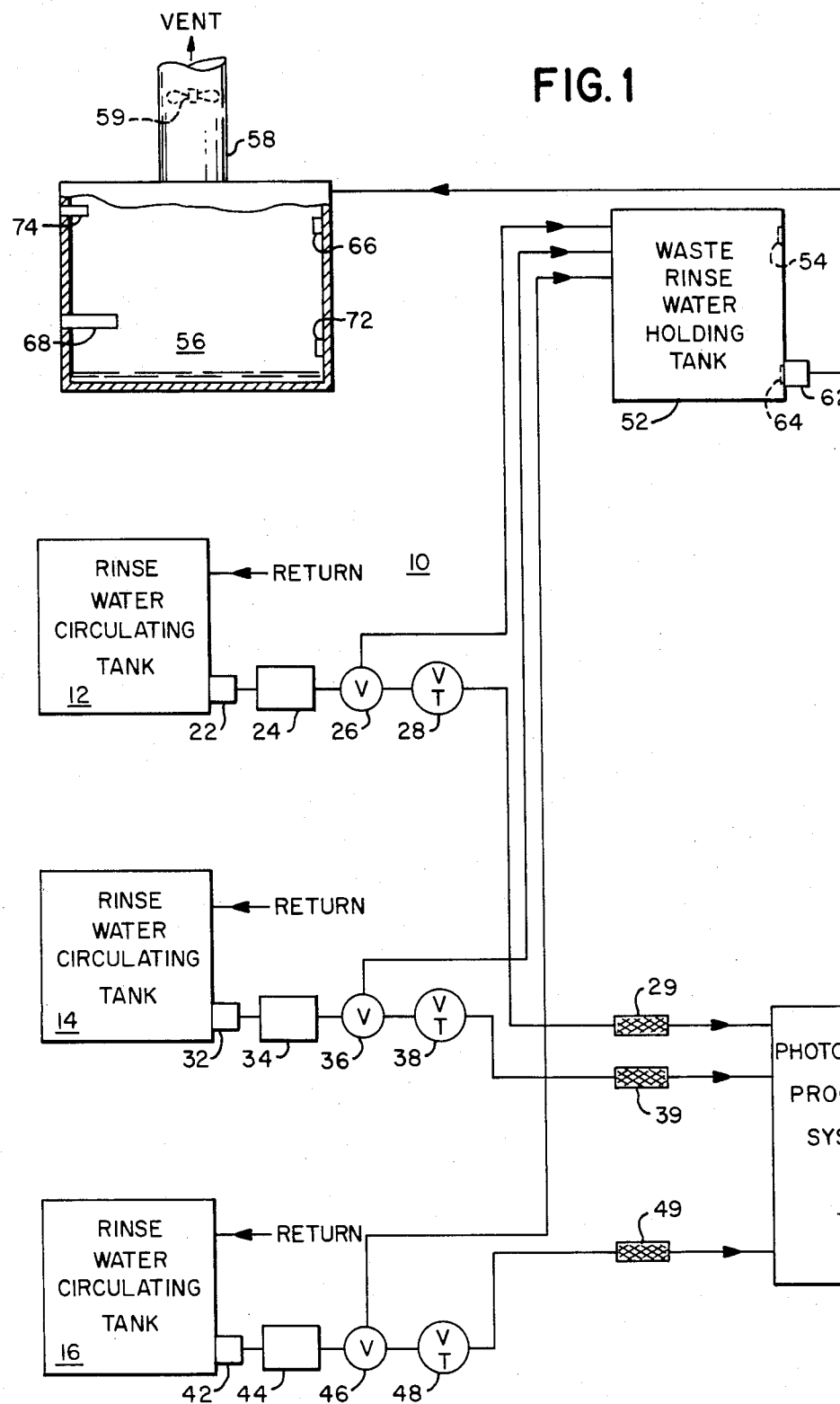
FIG. 1 is a block diagram showing schematically the functional aspects of a preferred embodiment of this invention.

Referring to FIG. 1, there are shown three rinse water circulating tanks 12, 14, and 16 which contain the rinse water to be utilized in the developing and printing processes within photographic processing system 18 as is understood in the art. Typicaly, contents of two of the rinse water tanks 12, 14, and 16 would be employed in the developing of the film while the contents of the remaining tank would be employed in the printing process.

Tank 12 would be provided with a pump 22 to pump its rinse water through a flow meter 24, a multi-port valve 26, a needle or throttle valve 28 to photographic processing system 18 for use therein, and a filter 29 for trapping particulate material. The used rinse water is returned to tank 12 by way of RETURN line schematically shown.

Similarly, tank 14 is provided with a pump 32, flow meter 34, multi-port valve 36, needle or throttle valve 38, filter 39, and a RETURN line. Tank 16 is provided with a pump 42, flow meter 44, multi-port valve 46, needle or throttle valve 48, filter 39, and a RETURN line. Typically, pumps 22, 32, and 42 would be located within their respective rinse water tanks.

In the operation of the system described so far pumps 22, 32, 42 as required for processing system 18 would be turned on as needed with their respective throttle valves 28, 38, and 48 adjusted for the flow rate required by system 18 as indicated by the respective flow meters 24, 34, and 44.

As will be seen by a description below of the preferred embodiment of compact and free-standing apparatus incorporating the principles of this invention, flow meters 24, 34, and 44 are of the type that the rinse water is visible so that its color or shade can be monitored. When the rinse water becomes recognizable as understood in the art to require replacement with fresh rinse water then steps are taken as will now be described to divert the now waste rinse water for disposal and replacement by fresh rinse water.

For example, the operator notes from flow water 24 that the rinse water within tank 12 requires replacement. For this purpose there is provided a waste rinse water holding tank 52. Multi-port valve 26 is manually adjusted to divert the rinse water in tank 12 into holding tank 52 until tank 12 is empty. Then multi-port valve 26 would be returned to its normal flow direction, that is, into photographic processing system 18, and fresh rinse water would be inserted through a separate line (not shown) or the RETURN line.

It should be noted that waste rinse water holding tank 52 is provided with a high limit sensor switch 54 to shut down pump 22 when the tank is full although the normal capacity of tank 52 would be to permit complete emptying of tank 12 so that a fresh rinse water solution can be prepared therein.

In order to dispose of the waste rinse water within holding tank 52 there is provided a dissolution tank 56 with a vent 58 having an exhaust fan 59 to discharge the water vapors to be produced into the atmosphere.

A pump 62, typically mounted within tank 52, would continuously, when its switch to be identified later is on, transfer the waste rinse water to dissolution tank 56 while a low limit sensor switch 64 would act to shut down pump 62 when the supply of waste rinse water drops below a certain level. In addition, a high level sensor switch 66 within dissolution tank 56 would also operate to shut down pump 62 within tank 52 when tank 56 is full. One or more electrical resistor heaters 68 within dissolution tank 56 maintain the temperature of the waste rinse water in the latter tank at a simmer, typically a temperature of about 180° F. so that there is a continuous discharge of water vapor into the atmosphere. A low level sensor switch 72 will act to shut down heater(s) 68 when the level within tank 56 drops below a predetermined level.

The various sensor switches described. for example, switches 54 and 64 in holding tank 52, as well as those in tank 56, are conventional and are available in the marketplace, as for example, those sold under the trade name PROTEC, by Process Technology, Inc.

Eventually, as the contaminants contained in the waste rinse water within tank 56 become concentrated to form a slurry filling the latter, tank 56 would be shut down, opened up, and the slurry physically removed by scooping or vacuuming and deposited in a 55-gallon drum. Tank 56 is not cleaned out until all its contents form a slurry thereby facilitating the accumulation, storage and shipment of the waste material. It has been found that in a typically sized photographic processing installation for which this apparatus is intended, between three and five drums a year would be accumulated, and shipped to a refinery for reprocessing to remove some of the valuable recoverable constituents therein such as silver and other metals. It might be noted at this point that, if desired, the most valuable constituent, silver, could be 20 removed chemically first from the rinse water holding tank 52.

Inasmuch as the slurry accumulated in the drums contains reclaimable materials, it is not considered by regulatory authorities under current regulations as a hazardous waste. it is referred to as a byproduct of commerce because of its recoverable contents.

The system shown in FIG. 1 includes a variety of other safety features. For example, a bimetallic temperature operated switch 74 located within 56 immersed in the waste rinse water will shut down electric heater(s) 68 when an excessive temperature, i.e., 190° F. is reached.

Figure 2:
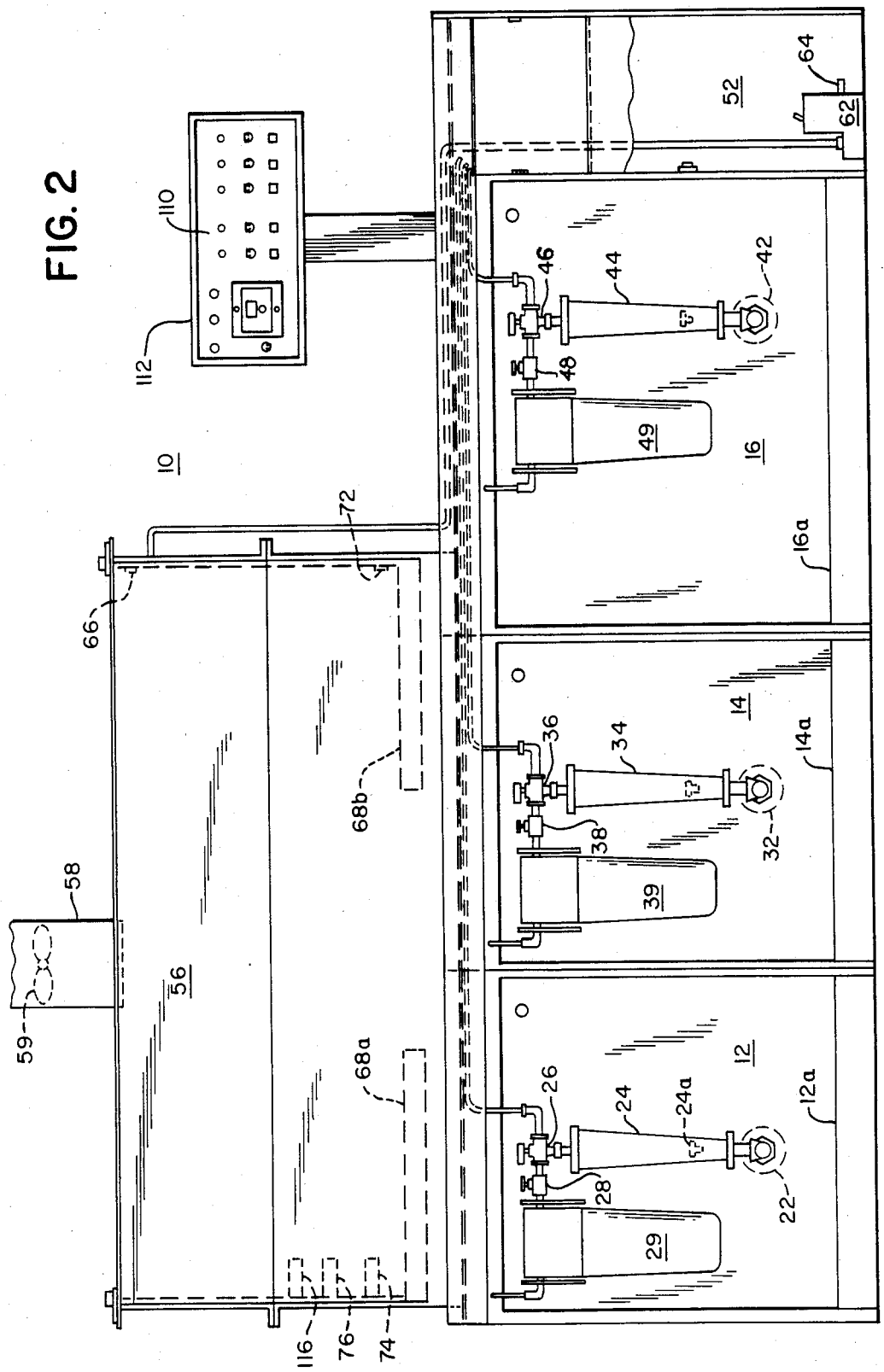
FIG. 2 is an elevation view of compact and freestanding apparatus of the preferred embodiment of this invention.

For a description of compact and free-standing apparatus incorporating the system shown in FIG. 1 and containing other novel features of this invention, reference is made to FIG. 2.

Apparatus 10 consists of a compact assembly of rinse water circulating tanks 12, 14, and 16 with catch basins 12a, 14a, and 16a, respectively. Rinse water tank 12 is provided on its outside and above its catch basin 12a with its transparent flow meter 24 with a float 24a to indicate rate of flow, multi-port valve 26, needle or throttle valve 28, and filter 29 for trapping particulate material.

Rinse water tank 14 is similarly provided with flow meter 34, multi-port valve 36, needle or throttle valve 38, and filter 39; and tank 16 with flow meter 44, multi-port valve 46, needle or throttle valve 48, and filter 49. Pumps 22, 32, and 42 are located within their respective tanks 12, 14, and 16.

It will be seen that waste rinse water holding tank 52 with its sump pump 62, low level sensor switch 64, and high level sensor switch 54 is located in line with tanks 12, 14, and 16. Sitting on top of the latter tanks is dissolution tank 56 with a pair of resistive electric heaters 68a and 68b, its high level and low level sensor switches 66 and 72, and temperature operated switches 74 and 76.

On top of tank 56 is shown vapor vent 58 containing exhaust fan 59.

Figure 3:
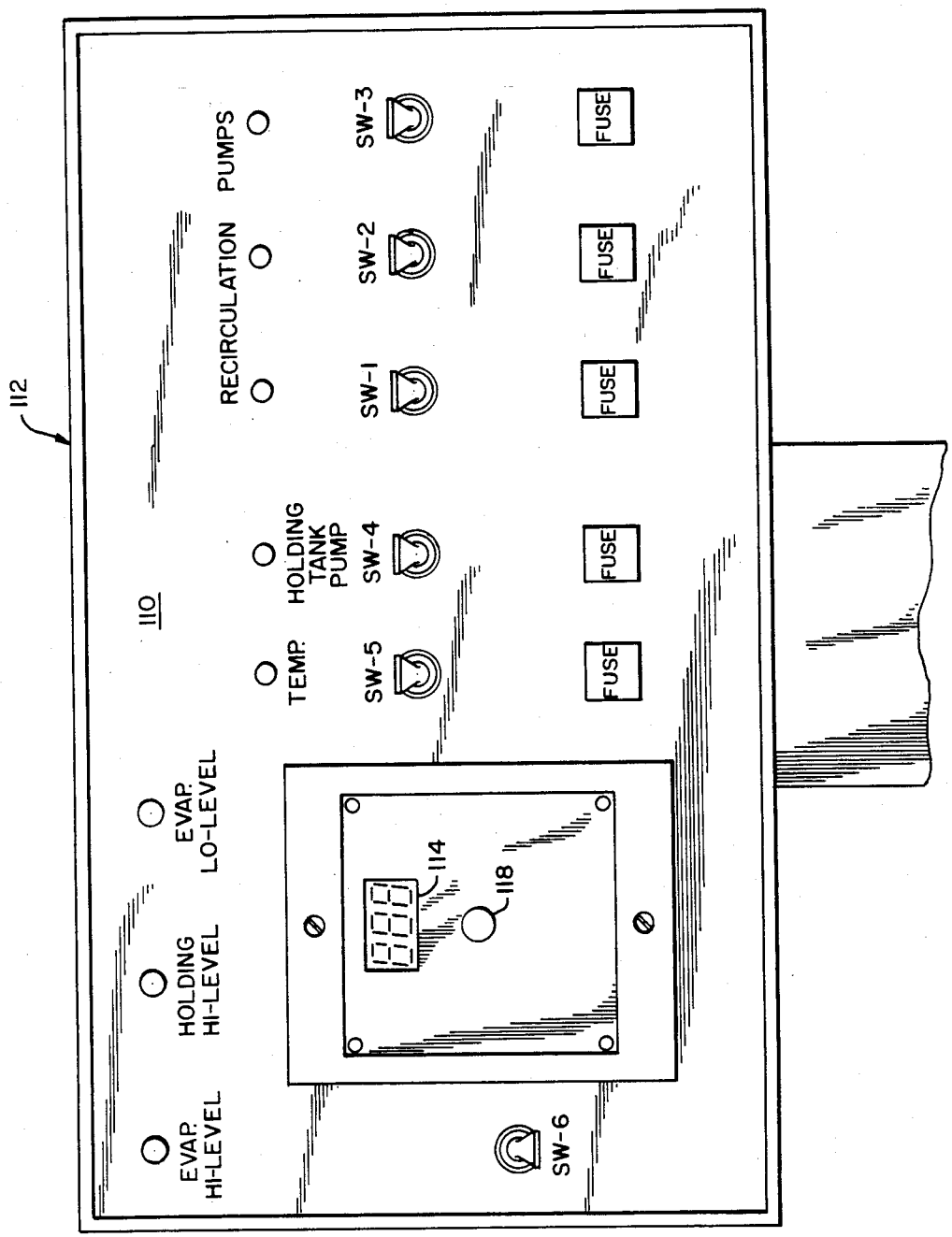
FIG. 3 illustrates the face of the control panel for the preferred embodiment.

A control panel 110 attached to a console 112 containing the electrical circuit for the apparatus is located as shown next to tank 56. As seen in FIG. 3, console 112 has switches SW-1, SW-2, and SW-3 to control the operation of pumps 22, 32, and 42 within tanks 12, 14, and 16, respectively. Switch SW-4 controls sump pump 62 in waste rinse water holding tank 52. A switch SW-5 is provided to adjust the temperature selected for the liquid within dissolution tank 56. A digital readout 114 displays the temperature within tank 56 using a temperature probe 116 (seen in FIG. 2) for this purpose. When button 118 is depressed, then switch SW-5 may be employed to change the selected temperature. This arrangement for selecting and controlling liquid temperature is conventional and commercially available. The lamps illustrated and as indicated show when the tank 56 high level switch 66 has been tripped (indicating the tank is full), when holding tank 52 is full (detected by sensor 54), when tank 56 is empty or near empty, when the temperature control is actuated, and when the various pumps are running. Fuses on the face of console make it simple to change fuses in case of an overload. Console 110 contains an audible alarm in case any of the limit (i.e., liquid level, temperature, etc.) switches are tripped and a switch SW-6 may be employed to disengage the audible alarm.

Figure 4:
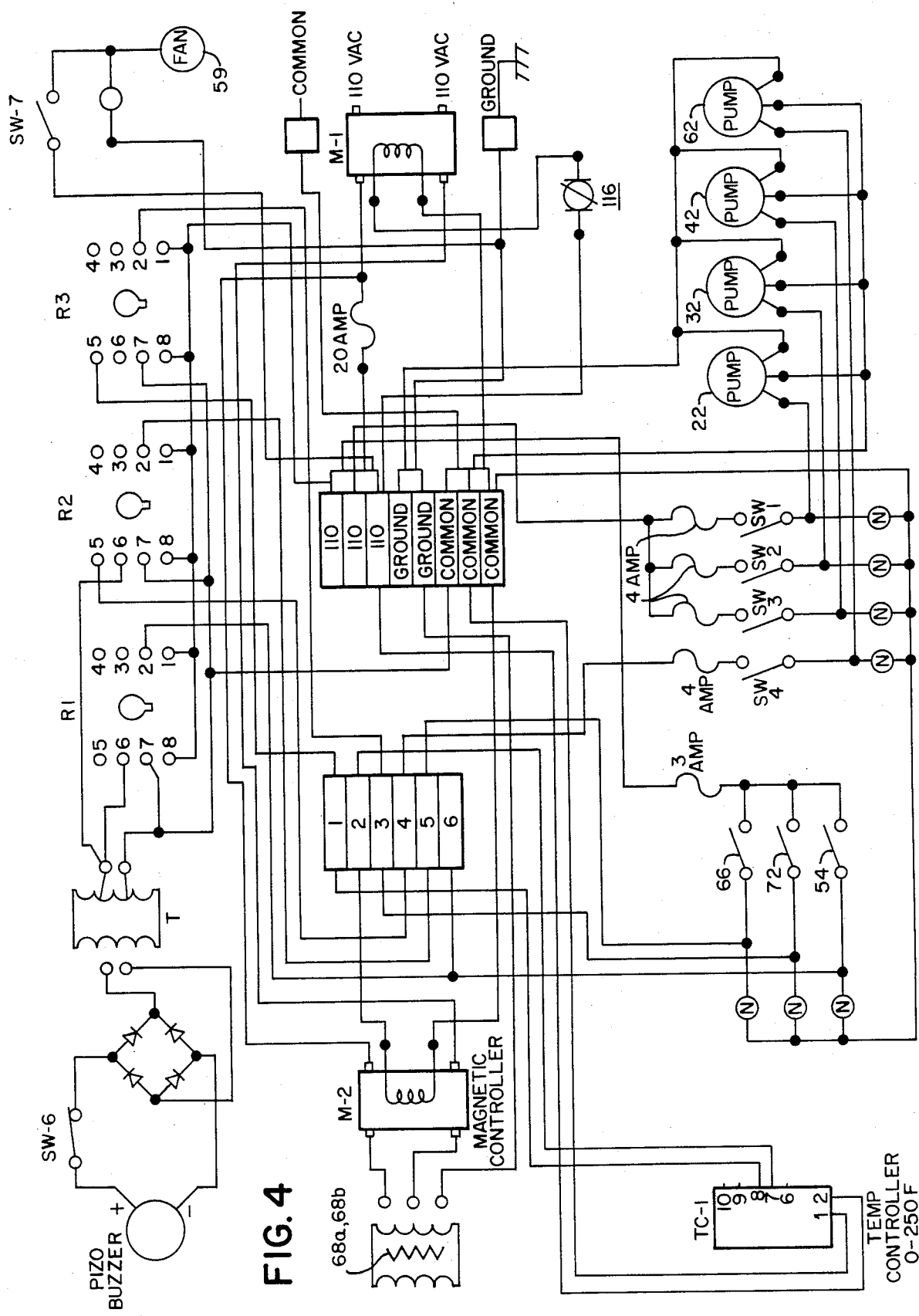
FIG. 4 shows a schematic for connecting up the various electrical components of the preferred embodiment.

While not a part of this invention since the circuitry involved in connecting up the various switches, pumps, lights, and alarms referred to herein are considered to be well within the scope of the art at present, details of a typical such circuit are shown in FIG. 4.

Illustrated are switches SW-1, SW-2, and SW-3 to control the operation of pumps 22, 32, and 42, respectively. Switch Sw-4 actuates pump 62 in waste rinse water holding tank 52. Normally open sensor switches 66, 72, and 54 are shown connected through relays R1, R2, and R2 (whose sockets are illustrated) to override the operation of pump 62 when holding tank 52 is empty or tank 56 is full, and to shut down power to electric heaters 68a and 68b when the level in tank 56 drops too low.

In the sockets illustrated for relays R1, R2, and R3, the coils in the relays are connected between contacts 2 and 7. Connection between contacts 5 and 4 are normally closed while between 6 and 3 are normally open. Shown also are the audible alarm (buzzer) and normally closed switch SW-6 for use when the alarm is to be disabled. A transformer T is employed because the buzzer operates on 24 volts. The various neon lamps are indicated by N.

The normally closed switch in temperature sensor 116 to turn off power to heaters 68a and 68b in the event excessive temperatures, i.e., 200° F. is reached is illustrated between the line power and the load. Magnetic contactor M-1 shuts down all power to the system in the event of the temperature overload. Magnetic controller M-2 supplies the electric power to the resistive heaters 68a and 68b in dissolution tank 56. Magnetic controllers M-1 and M-2 are commercially available devices for connecting up to line power. The diagram also shows a normally closed switch SW-7 to operate fan 59 located in the exhaust duct. This switch is not shown on console 112. Temperature controller TC-1 which is commercially available contains both the thermostatic control for dissolution tank 56 as well as for the selection of the desired temperature and the digital display, previously noted in connection with switch SW-5.

In the operation of the apparatus described, fresh rinse water solution is prepared for and fills tanks 12, 14, and 16. As required for use in photographic processing system 18, switches SW-1, SW-2, and SW-3 are employed to operate pumps 22, 32, and 42, respectively. Filters 29, 39, and 49 remove the solid particulate which collect in the rinse waters. Needle or throttle valves 28, 38, and 48 are employed for establishing the rates of flow was required in each rinsing operation, and multiport valves 26, 36, and 46 are normally in the position of directing flow to system 18.

The condition of the rinse is monitored through the transparent housings of flow meters 24, 34, and 44, the locations of the floats therein indicating the rate of flow. when it is determined, for example, by visual inspection of color or shade of the liquid in flow meter 24 that the rinse water within tank 12 needs replacement, multiport valve 26 is adjusted to direct flow into waste rinse water holding tank 52. With switch SW-4 in the closed position, pump 62 transfers this liquid into evaporator tank 56 where maintenance of a simmering temperature, i.e., 180° F., gradually drives off water vapor through vent 58, concentrating the impurities within the remaining liquid. When rinse water tank 12 is empty, a fresh rinse water solution is prepared for it.

In this time, as waste rinse water for all three tanks 12, 14, and 16 is transferred to the holding tank 52 and in turn into dissolution tank 56, a slurry is formed within tank 56. When the latter becomes filled and contains only slurry of the desired consistency to some level at the option of the operator of the equipment, pump 62 and the heating members 68a and 68b within tank 56 would be shut down, and cover 56a removed. The slurry within this tank is then physically removed, by automatic pump or by scooping the material out and depositing it in a drum for accumulation. After emptying tank 56, operation of apparatus 10 can be resumed.

It will be noted that apparatus 10 is a compact and self-contained unit without any discharge of liquid products into the sewage systems or the ground. It is almost completely constructed out of plastic material so that it is light in weight and thus easy to ship and to put in place. The only discharge of any type to the environment is water vapor which is free of any contaminants.

Current regulations of local, state, and federal environmental authorities have severe restrictions on the quantity and nature of liquid wastes which can be disposed of locally. these restrictions change from time to time so that a system which meets the restrictions now in effect might not be acceptable at some future time when the restrictios are tightened. The present invention avoids the problem altogether by eliminating the need for any liquid discharge.

Another advantage of this invention is its compactness, small size, and relatively small cost to the local film processor. The unit, once installed at a relatively low cost, requires virtually no maintenance or monitoring by any personnel, and there is no need for technically trained persons to be on the premises as in other waste disposal systems. The only maintenance ever required, other than possibly a repair in case of equipment failure, is to shut down the apparatus and remove the slurry which has accumulated within the dissolution tank. Since, as previously mentioned, a typical installation of a local nature is likely to accumulate three to five barrels of slurry during the year, the cost of the infrequent shipments to reprocessing centers is relatively small and cost effective for installation of this size. In addition, since the slurry is not classed as a hazardous material, there are no current restrictions on the length or nature of its storage with additional savings resulting to the user of this equipment.

While only certain preferred embodiments of this invention have been described, it is understood that many variations of the invention are possible without departing from the principles of this invention as defined in the claims which follow.

What is claimed is:

1. Apparatus for recycling and treating waste rinse water containing waste chemical products in a photographic processing system on a continuous basis without liquid discharge into the environment comprising circulating tank means for storing rinse water for use in said photographic processing system, means for circulating rinse water in said circulating tank means to said photographic processing system, said circulating tank means having means to receive said rinse water after use in said system, holding tank means adjacent said circulating tank means for storing waste rinse water, means to determine without interruption of rinse water circulation that said rinse water has become waste rinse water as the result of contamination, means for directing flow of the waste rinse water contents of said circulating tank means into said holding tank means, dissolution tank means mounted above said circulating tank means for receiving the waste rinse water from said holding tank means, pump means for transferring waste rinse water from said holding tank means into said dissolution tank means, means for heating without boiling and causing evaporation of the water within said dissolution tank means, and means for discharging into the environment the water vapor from said dissolution tank means for concentrating continuously over a period of time the waste chemical products present in said rinse water, and means for shutting down said pump means upon said dissolution tank becoming full with slurry.

2. The apparatus as set forth in claim 1 having multiple circulating tank means in parallel with each other for supplying rinse water to said photographic processing system whereby circulation of said rinse water is maintained by one of said circulating tank means while another circulating tank means is transferring waste rinse water to said holding tank means.

3. The apparatus as set forth in claim 2 in which said circulating tank means and said holding tank means are all arranged adjacent to each other with catch basins for collecting any leaking rinse water.

4. The apparatus as set forth in claim 3 in which said heating means comprises electrical resistive heating means.

5. The apparatus as set forth in claim 4 having means responsive to a predetermined temperature within said dissolution tank means for terminating operation of said electrical heating means in order to prevent boiling.

6. The apparatus as set forth in claim 1 having means in response to a predetermined level of waste rinse water in said dissolution tank means for terminating flow of waste rinse water from said holding tank means into said dissolution tank means.

7. The apparatus as set forth in claim 6 having means in response to a predetermined level in said holding tank means to terminate flow from said circulating tank means into said holding tank means.

8. The apparatus as set forth in claim 1 having multiple circulating tank means for carrying different rinse water solutions, each provided with circulating and directing means.

* * * * *